United States Patent
Cantin et al.

(10) Patent No.: US 8,615,636 B2
(45) Date of Patent: Dec. 24, 2013

(54) MULTIPLE-CLASS PRIORITY-BASED REPLACEMENT POLICY FOR CACHE MEMORY

(75) Inventors: Jason Frederick Cantin, Round Rock, TX (US); Prasenjit Chakraborty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 13/039,755

(22) Filed: Mar. 3, 2011

(65) Prior Publication Data

US 2012/0226871 A1  Sep. 6, 2012

(51) Int. Cl.
 G06F 12/12 (2006.01)
(52) U.S. Cl.
 USPC ............................................ 711/133; 711/207
(58) Field of Classification Search
 USPC .......................................... 711/135, 133, 207
 See application file for complete search history.

(56) References Cited

U.S. PATENT DOCUMENTS

| | | | |
|---|---|---|---|
| 5,802,568 A | 9/1998 | Csoppenszky | |
| 6,453,387 B1 | 9/2002 | Lozano | |
| 7,082,508 B2 | 7/2006 | Khan et al. | |
| 7,231,506 B2 | 6/2007 | Ike | |
| 7,418,553 B2 | 8/2008 | Yoshimi | |
| 7,426,626 B2 | 9/2008 | Augsburg et al. | |
| 2005/0283573 A1* | 12/2005 | Mewhinney et al. | 711/136 |
| 2006/0069876 A1* | 3/2006 | Bansal et al. | 711/134 |
| 2007/0106847 A1* | 5/2007 | Bonwick et al. | 711/133 |
| 2009/0063776 A1* | 3/2009 | Williams | 711/136 |
| 2010/0241822 A1 | 9/2010 | Chang et al. | |
| 2010/0318742 A1* | 12/2010 | Plondke et al. | 711/123 |

* cited by examiner

*Primary Examiner* — Jared Rutz
(74) *Attorney, Agent, or Firm* — Isaac J. Gooshaw; Jason H. Sosa

(57) ABSTRACT

This invention is a method and system for replacing an entry in a cache memory (replacement policy). The cache is divided into a high-priority class and a low-priority class. Upon a request for information such as data, an instruction, or an address translation, the processor searches the cache. If there is a cache miss, the processor locates the information elsewhere, typically in memory. The found information replaces an existing entry in the cache. The entry selected for replacement (eviction) is chosen from within the low-priority class using a FIFO algorithm. Upon a cache hit, the processor performs a read, write, or execute using or upon the information. If the performed instruction was a "write", the information is placed into the high-priority class. If the high-priority class is full, an entry within the high-priority class is selected for removal based on a FIFO algorithm, and re-classified into the low-priority class.

25 Claims, 5 Drawing Sheets

MULTIPLE-CLASS PRIORITY-BASED REPLACEMENT POLICY FOR CACHE MEMORY

BACKGROUND

1. Field of the Invention

The disclosure relates generally to a method and system for replacing an entry in a cache, and more specifically to using the method and system to implement a multiple-class priority-based replacement policy for a cache memory.

2. Description of the Related Art

Modern computer systems employ cache memories in addition to main memory. The access latency of cache memory is significantly less than the access latency of main memory. One type of these cache memories retains recently accessed data, in the presumption that this data will be accessed again in the future. A second type of these cache memories retains recently accessed instructions. A third type of these cache memories retains recently accessed mappings of virtual to physical addresses; such a cache is referred to as a Translation Lookaside Buffer (TLB). A valid cache entry in a data cache or instruction cache references a page in memory where the data or instruction is stored. An entry in a TLB also references a page in memory as the address translation stored in an entry of the TLB identifies a specific page in memory.

Memory operations performed by a processor access cache memory first. For example, an action such as read, write or execute, is requested to be performed at a page in memory. The processor translates, if necessary, the page address within a TLB. Then the processor looks to a data or instruction cache to see if information from the referenced page may be found there. In the event that the accessed data, instruction, or address is not found in the cache (termed a cache miss), the processor must wait for an extended period of time while that data, instruction, or address is loaded into the cache from a slower or more remote memory. Processor stalls caused by this wait period comprise the majority of execution time for many applications.

A cache memory is logically organized as a set of cache entries. When a cache miss occurs, the cache in which a new entry is to be placed is first examined; if that cache is full, room must be created for the new entry by evicting one of the currently residing entries from the cache. This entry selected for eviction is termed the victim. Many techniques have been developed to determine the best choice of victim, such that the miss rate to the cache will be minimized. These are known in the art as replacement policies. Examples include least-recently used (LRU) algorithms and First-In First-Out (FIFO) algorithms. These replacement policies have been designed to minimize the frequency of misses to the cache.

A TLB may comprise a Content Addressable Memory (CAM) and associated Random Access Memory (RAM), each having a fixed number of entries. The CAM performs a parallel comparison of a virtual page number presented for translation, against all stored, previously translated virtual page numbers. The output of the CAM is the location of the stored virtual page number that matches the applied virtual page number. This location indexes the RAM, which provides the stored physical page number corresponding to the virtual page number, as well as the page attributes. The physical address applied to the cache and/or main memory is then the physical page number retrieved from the TLB, concatenated with the page offset from the virtual address.

When a TLB miss occurs, the processor must traverse page tables to perform a translation (page walk). When the page walk is complete, the virtual and physical page numbers and page attributes are stored in an empty entry in the TLB. If the TLB is full, an entry must be victimized. Replacement policies for this victimization include random, round-robin, not recently used, second-chance FIFO, and the like. Some policies, such as the not recently used, may identify different types of entries with identification bits, but clear all identification at a set time or pre-defined occurrence.

The design of TLBs, in particular first-level TLBs, is constrained by area, power, and cycle-time. The need to have 0-cycle access times (or as near as possible) forces these structures to be small. To maximize hit rate and avoid constraining which pages can coexist in the TLB, these structures also tend to be fully associative. In addition, these structures are often replicated to increase read bandwidth so they can be accessed concurrently by different ports. The highly associative nature of TLBs, combined with short access times and the difficulty of combining history information from multiple reference streams makes LRU-type replacement policies costly and infeasible. For example, LRU replacement requires an update with every access, a complicated order-list to be maintained to keep track of when each entry was accessed, and if there are many copies of the cache, multiplied complexity. Hence, many first-level TLBs tend to use simple replacement policies such as a FIFO replacement policy due to simplicity of implementation and low overhead.

SUMMARY

The different embodiments provide a method and system for replacing an entry in a cache. A processor receives a first request for information, such as data, an instruction, or an address, and in response, the processor searches for the information within the cache. In response to a cache miss, the processor locates the requested information outside of the cache. An entry is selected from a first class of entries to be evicted from the cache. The entry selected for eviction is replaced with the requested information. A second request for the information is received, and in response to a cache hit, the processor performs an action (read, write, or execute) for a referenced page corresponding to the second request. The entry that contains the information is marked as belonging to a second class of entries. Another entry from the second class of entries is reclassified into the first class of entries.

DETAILED DESCRIPTION

As will be appreciated by one skilled in the art, aspects of the present invention may be embodied as a method or system. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

In the course of developing the invention, the inventors found that for small, highly associative caches like a TLB, to avoid the complexity and overhead of a more optimal replacement policy such as LRU, optimization is traded for the simplicity and low-overhead of a FIFO replacement policy. The inventors also found that with FIFO replacement, any time a program begins streaming through pages, the entire content of a TLB may be replaced. Because history is not incorporated, important pages are not protected and are replaced with less important ones. This increases the miss rate and lowers performance.

Figure 1:
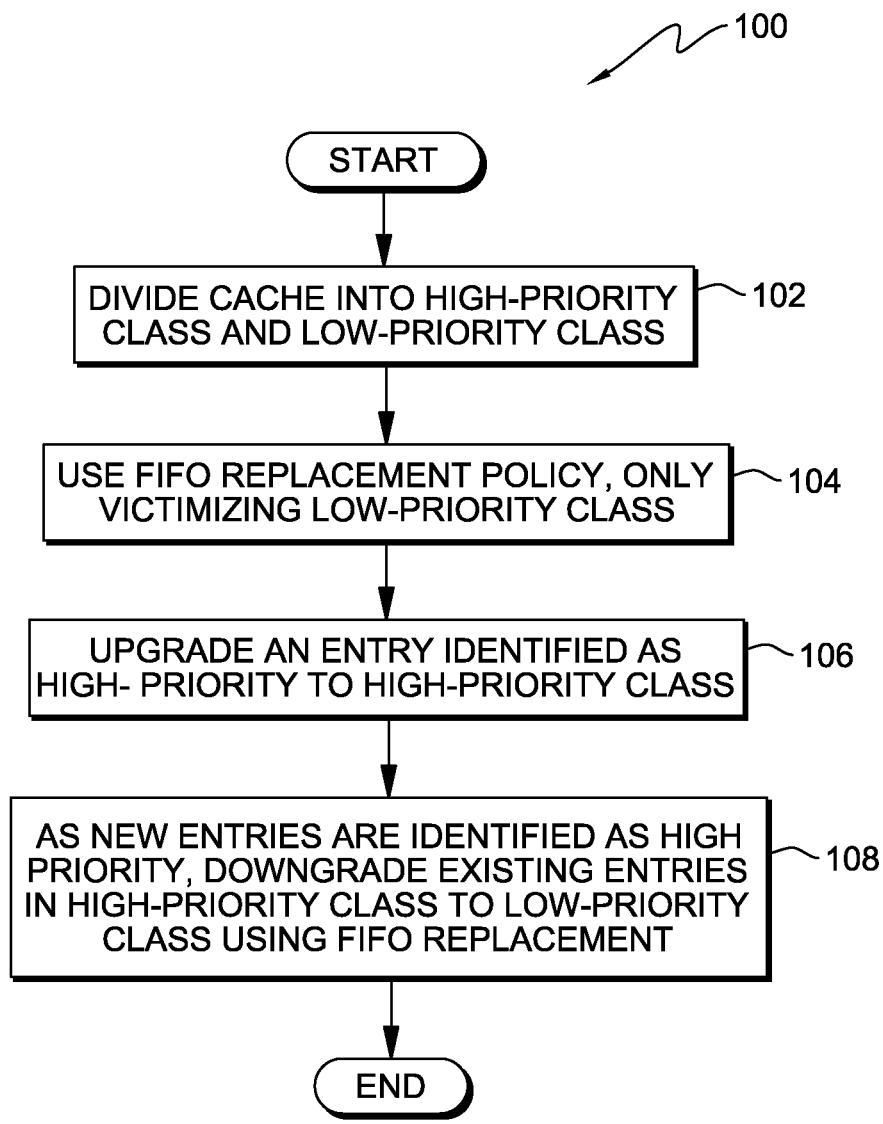
FIG. 1 illustrates a flowchart of a process for selecting and removing an entry in a memory cache in accordance with an illustrative embodiment.

With reference now to the figures and, in particular, with reference to FIG. 1, a flowchart of a process for selecting and removing an entry in a cache memory is depicted in accordance with an illustrative embodiment. Process 100 is an example of a process used for a Two-Class Priority-Based Replacement Policy (TCPB replacement policy), which is an embodiment of a Multiple-Class Priority-Based Replacement Policy.

Process 100 begins by dividing the cache into two classes of entries (102), one a high-priority class and the other a low-priority class. In a preferred embodiment, the cache is a Translation Lookaside Buffer (TLB). Dividing the cache into the two classes may be done in various ways. In one embodiment, as the cache is populated, each entry is examined and marked/assigned/classified as belonging to either the high-priority or low-priority class. In a preferred embodiment, each entry is placed in the cache as a low priority entry and may at a later time be upgraded to the high-priority class. A user of skill in the art will understand that in other embodiments, multiple classes may be created for multiple levels of priority.

Process 100 victimizes entries only from the low-priority class (104). "Victimizing" an entry refers to a process of evicting the entry from the cache to make room for a new entry. When the cache is searched for information (such as data, an instruction, or virtual address) and the information is not found (cache miss), the information will be found outside of the cache, typically in memory, and is entered into the cache as the new entry. Caches hold a small number of what are preferably highly used entries. This is especially true for TLBs, which in a first-level TLB might only have space for eight entries. In a preferred embodiment, the entry evicted from the low-priority class is based on a First-In First-Out (FIFO) algorithm, such that entries that have been in the low-priority class longer will be the first entries selected for eviction from the class. In a TCPB replacement policy such as process 100, an entry might be reclassified from one class to another, and at times an entry may become invalid requiring the invalid entry to be removed first. Such circumstances may result in some level of variation from exact FIFO execution wherein the oldest entry in the low-priority class may not always be the first removed.

Process 100 includes identifying an entry to be upgraded to the high-priority class (106). When the cache is searched for information and the information is found in an entry of the cache (cache hit), an action (read, write, or execute) is performed for a referenced page corresponding to the cache entry. In a preferred embodiment the action performed on the page is used to determine if the entry should be marked as high priority. Alternately, page attributes may be used to determine if the entry should be marked as high priority.

In one embodiment, in response to marking the entry as high priority, the entry moves to a separate cache designated for entries within the high-priority class. In a preferred embodiment, the entry remains in the cache and is designated as a member of the high-priority class through an indicator within a field of the entry.

As new entries are transferred to the high-priority class, existing entries in the high-priority class may be deprioritized and transferred to the low-priority class (108). The number of entries in the high-priority class must be less than the number of entries in the cache. In a preferred embodiment, the number of entries in the high-priority class would not exceed half of the number of entries in the cache and would be a static number. When the high-priority class is filled an entry within the high-priority class is removed to allow for a new entry. In process 100, when the high-priority class removes the entry to allow for a new one, the entry will not be evicted from the cache, but is instead re-classified into the low-priority class. In a preferred embodiment, the entry selected for removal (re-classification) is selected based on a FIFO algorithm.

In an embodiment where more than two classes exist, each higher priority class removes an old entry, preferably the oldest, to make room for a new one, and places the old entry into the next highest priority class. Entries may only be evicted from the cache completely from the lowest priority class. Each class will preferably select the entry for removal based on a FIFO algorithm.

Figure 2:
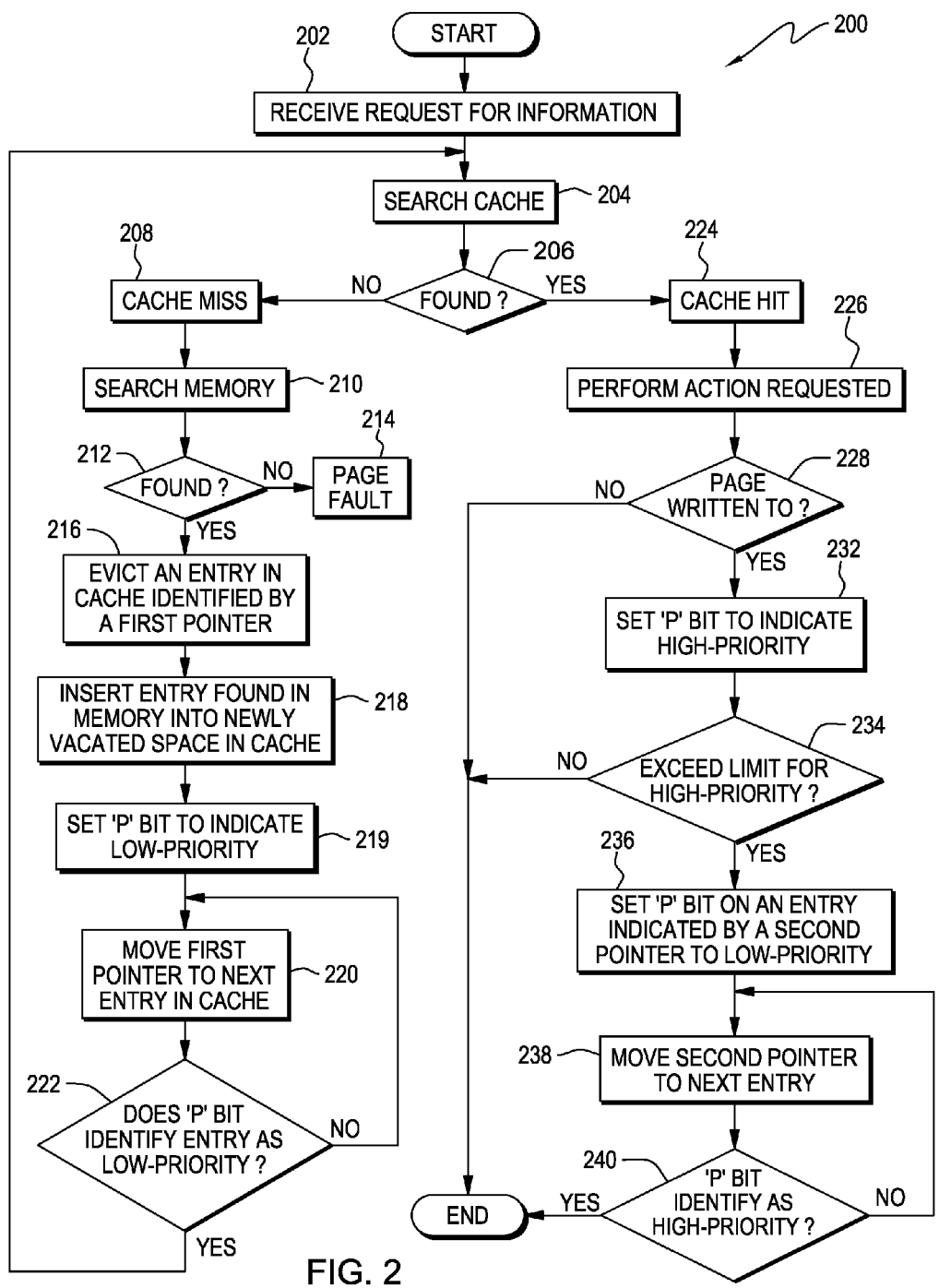
FIG. 2 illustrates a flowchart of a process for a two-class priority-based FIFO replacement policy in accordance with an illustrative embodiment.

FIG. 2 depicts a flowchart of a process for a TCPB FIFO replacement policy. Within this embodiment of the TCPB replacement policy, process 200 uses FIFO based algorithms to deprioritize a high-priority entry to a low-priority entry and to evict a low-priority entry.

Process 200 begins with a request for information (202). The information requested may be an instruction, data, or, as in the preferred embodiment, an address to be translated by a TLB.

Process 200 then searches the cache for the information (204) and determines whether the information can be found within the cache (decision block 206). If the information was not found, process 200 registers a cache miss 208. If the information was found within the cache, process 200 registers a cache hit 224.

In the case of a cache miss 208, process 200 searches memory (210) for the information. In a preferred embodiment, where the cache is a TLB, search memory step 210 includes performing a page walk on a page table within local or remote memory.

Process 200 includes determining if the information was found in an entry in memory (decision block 212). If not, a page fault is generated (214) requiring operating system (OS) intervention to move data from disk to physical memory. If in decision block 212, the information was found in an entry in memory, process 200 must select a victim entry to be evicted from the cache (216) to make room for the information. In accordance with the invention, the victim entry is selected from the low-priority class. In a preferred embodiment, the victim entry is identified by a first pointer, which for clarity of discussion may also be referred to as the eviction pointer.

Once selected (216), the victim entry is replaced by the located memory entry in the cache (218). Step 218 may be performed by overwriting the victim entry with the new entry. In a preferred embodiment, the new entry includes a single bit field identifying the priority class that the new entry belongs to, herein referred to as a 'P' bit, which is initially set to indicate low priority (219). Other embodiments may initialize all entries, including invalid entries, as low priority.

After the new entry is inserted (218) and the 'P' bit is set to low-priority (219), the eviction pointer moves from the new entry to the next entry in the cache (220).

Process 200 includes examining the 'P' bit of the entry that the eviction pointer currently rests on and determining in decision block 222 if the 'P' bit identifies the entry as low priority. If the 'P' bit instead identifies the entry as a member of the high-priority class, process 200 returns to step 220 to move the eviction pointer to the next entry within the cache. In this fashion, the eviction pointer traverses through the entries of the cache, passing over high-priority entries so that only entries of the low-priority class may be selected for victimization, and does so in a FIFO order. Those skilled in the art will understand that, in another embodiment, the eviction pointer may traverse multiple entries in a single cycle, by examining the 'P' bit of one or more of the next entries in the cache. In these embodiments, entries identified as invalid per a memory coherence protocol or otherwise may be considered to be within the low-priority class, allowing the invalid entries to be chosen for eviction as well.

If decision block 222 identifies the 'P' bit of the entry that the eviction pointer rests on as low priority, the eviction pointer remains there and process 200 returns to step 204 to search the cache for the information. In such an embodiment, all information (whether the information is an address, instruction, or data) must first be placed in an entry of the cache for any action (e.g. read, write, or execute) to occur concerning the referenced page corresponding to the information. This is common in a TLB. In another embodiment, an action may occur when the information is found in memory and process 200 ends when decision block 222 determines that the 'P' bit of the entry that the eviction pointer rests on is low priority.

In the case of a cache hit 224, a requested action 226, such as a read, write, or an execute, is performed on the referenced page corresponding to the information. When the requested information is an instruction, the action will typically be "execute," and when the requested information is data, the action will typically be a "read" or "write." When the information is an address, as in the preferred embodiment where the cache is a TLB, the action requested refers to the read, write or execute that is performed once the address translation has occurred and not to the address translation itself.

In one embodiment, the categorical identity of the action performed is utilized to determine the high or low priority classification of the entry. In a preferred embodiment, process 200 further includes determining if the requested action is a "write" (decision block 228). If not, process 200 ends. If the requested action is a "write," the 'P' bit of the entry corresponding to the requested action is set to indicate a high priority (232). In another embodiment, if the requested action is not a "write" as determined in decision block 228, the 'P' bit of the entry corresponding to the requested action may be set to indicate low-priority. In another embodiment still, a page corresponding to the entry is read and written in order to be classified as high priority. So a "read" action followed by a "write" or a "write" followed by a "read" would prioritize the entry, but a "read"-"read" or a "write"-"write" would remain in the low-priority class. In such an embodiment, an extra identifying field or bit is included in the entry to keep track of the previous action performed.

In other embodiments, process 200 bases the determination of whether to classify an entry as low or high priority upon one or more attributes of the memory page an entry is contained in. These attributes may include, for example, attributes indicative of whether the page is shared or private, whether the page permissions are read, write, or execute, whether a software selection has marked the page as high or low priority, and the recent history of page accesses.

After an entry is set as high priority (232) the process 200 must determine if the limit for entries in the high-priority class has been exceeded (decision block 234). This may be accomplished in a variety of ways. In one embodiment, a count is kept which increments as an entry is added to the high-priority class and decrements as an entry is removed from the high-priority class. In another embodiment, where the 'P' bit is a single bit wherein a 1 equals high priority and a 0 equals low priority, after an entry is put into the high-priority class, process 200 adds the 'P' bits of all entries in the cache and compares the result to a predefined number for maximum high-priority entries.

If the limit for high-priority entries is not exceeded, process 200 ends. If the limit is exceeded, process 200 must reclassify an entry from the high-priority class into the low-priority class. In a preferred embodiment process 200 resets the 'P' bit of an entry in the high-priority class, identified by a second pointer, to indicate a low priority (236). The second pointer may be referred to as the re-classify pointer for clarity.

After the 'P' bit on the entry has been reset to indicate a low-priority (236), the re-classify pointer moves to the next entry in the cache (238). Process 200 determines in decision block 240 if the 'P' bit within the next entry identifies the entry as high priority. If the 'P' bit indicates that the next entry is a member of the low-priority class, process 200 returns to step 238 to move the re-classify pointer to the next entry within the cache. In this fashion, the re-classify pointer traverses through the entries of the cache, passing over low-priority entries so that only entries of the high-priority class may be selected for re-classification, and does so in a FIFO order. When it is determined that the re-classification pointer rests on a high-priority class entry, process 200 ends.

Figure 3:
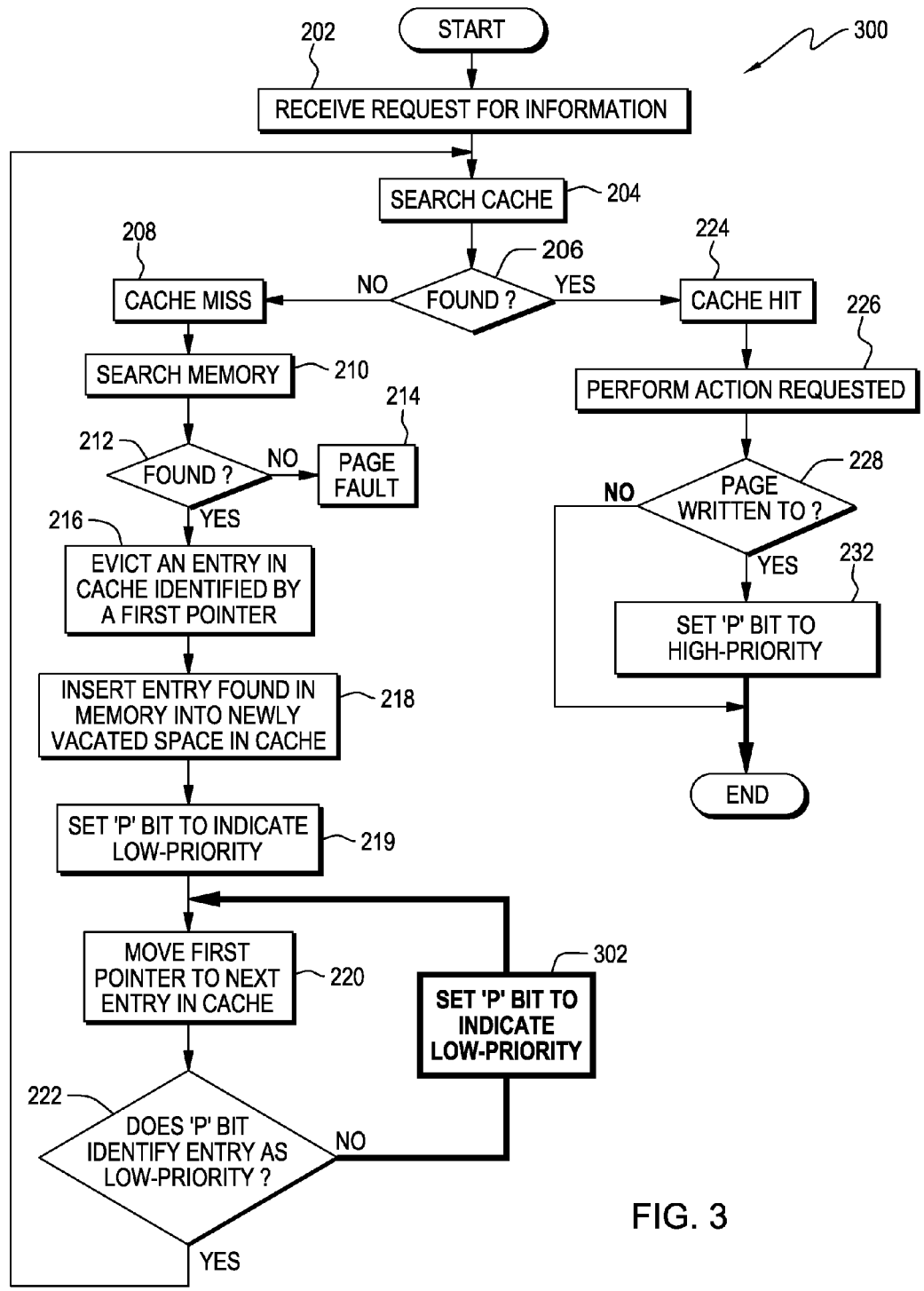
FIG. 3 illustrates a flowchart of a process for a simplified two-class priority-based FIFO replacement policy in accordance with an illustrative embodiment.

FIG. 3 depicts a flowchart of a process for a simplified TCPB FIFO replacement policy in accordance with an illustrative embodiment.

The illustrative embodiments depicted by process 200 function in a manner where each class is represented by a queue and wherein the high-priority queue drops its oldest entries into the low-priority queue, and the low-priority queue evicts its oldest entries from the cache completely. FIG. 3 instead depicts a flowchart of a process for a TCPB replacement policy where only one FIFO based queue is implemented and a FIFO approximation is used for deprioritizing entries in the high-priority class in accordance with an illustrative embodiment.

Process 300 follows process 200 for most steps. For clarity and to avoid repetition, steps from process 200 may be referred to where applicable. In process 300 the first pointer, or eviction pointer, is the only pointer being used.

Like process 200, process 300 receives a request for information (202), the cache is searched for the information (204), process 300 determines if the information has been found (206) and registers a cache miss (208) or cache hit (224).

When there is a cache hit (224), process 300 performs the action requested (226) and determines if that action was a "write" action (decision block 228). If the action was not a "write," process 300 ends. If the action was a "write," process 300 sets the 'P' bit to indicate high priority (232) and process 300 ends. This is a simple algorithm in which process 300 performs a requested action and determines priority classification. No other steps are taken.

On the other side, when there is a cache miss (208), process 300 performs the steps 210, 212, 214, 216, 218, 219, 220, 222, and the additional step 302. If in decision block 222 it is determined that the 'P' bit of the entry the eviction pointer rests on indicates high priority, before returning to step 220 to move to the next entry of the cache, process 300 first sets the 'P' bit of the entry the eviction pointer currently rests on to low priority (step 302). In this manner, every high-priority entry may be passed over once by the eviction pointer before once again becoming eligible for eviction. Such an embodiment would simplify the logic required by the invention and may reduce cost.

Figure 4:
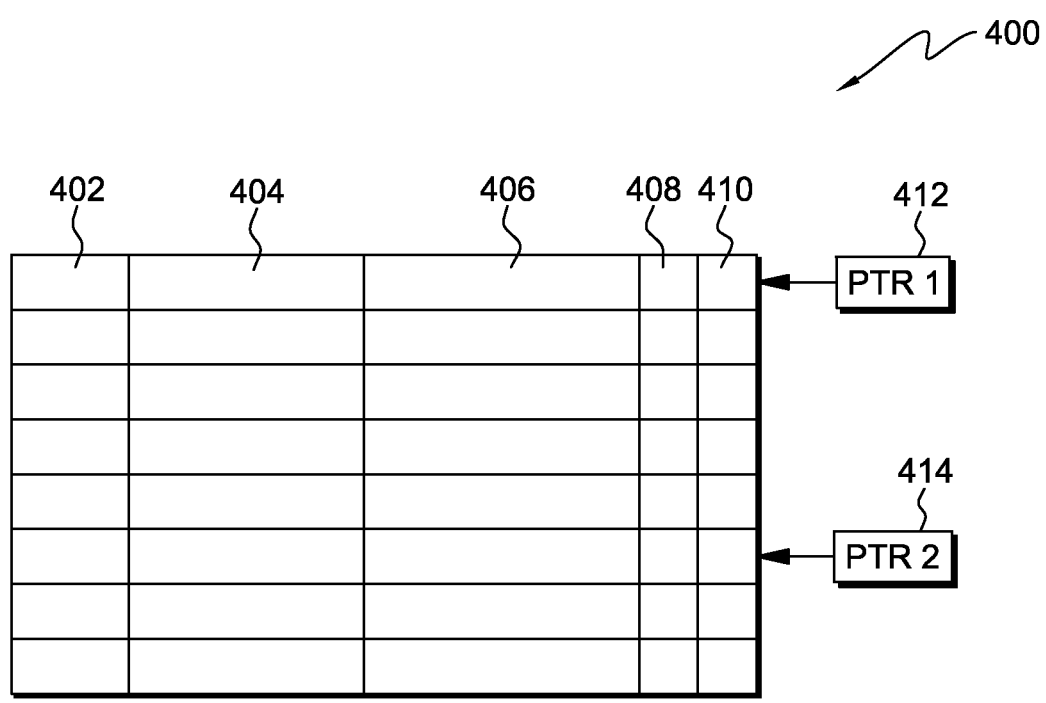
FIG. 4 illustrates a simplified block diagram of a cache, specifically a Translation Lookaside Buffer (TLB) cache, in accordance with an illustrative embodiment.

Referring now to FIG. 4, a depiction of a simplified block diagram of a cache, specifically a Translation Lookaside Buffer (TLB), is illustrated in accordance with an illustrative embodiment.

In an exemplary embodiment, TLB 400 maintains a fully associative array of eight entries. In other embodiments TLB 400 may maintain larger or smaller arrays. A cache used in accordance with an embodiment that is not a TLB may also maintain entries that are not partially or fully associative.

Each entry of TLB 400 has multiple fields comprising a page's status and protection information 402, such as IBM® PowerPC®'s WIMG bits, a portion of the physical address of the page 404, a portion of the virtual address 406 by which TLB 400 is searched, a validity bit 408, and a 'P' bit 410, such as the 'P' bit used in process 200 and process 300. A person of skill in the art will recognize that contents of a cache entry, even within a TLB, may vary. For example, different indexing methods may be used, additional fields may be added and existing fields may be removed, entire addresses may be used, and in the case of a data cache or instruction cache a field for data or an instruction may be included. This is just one subset of the various methods in which the entries may be structured.

TLB 400 also maintains pointer 412 and pointer 414. These are examples of FIFO pointers such as pointer 1 (eviction pointer) used in processes 200 and 300, and pointer 2 (re-classify pointer) used in process 200. Pointers 412 and 414 are configured to traverse the entries of TLB 400 in a circular pattern, wherein when either 412 or 414 reaches the last entry of TLB 400, that pointer circles back to the first entry on the pointer's next move.

Figure 5:
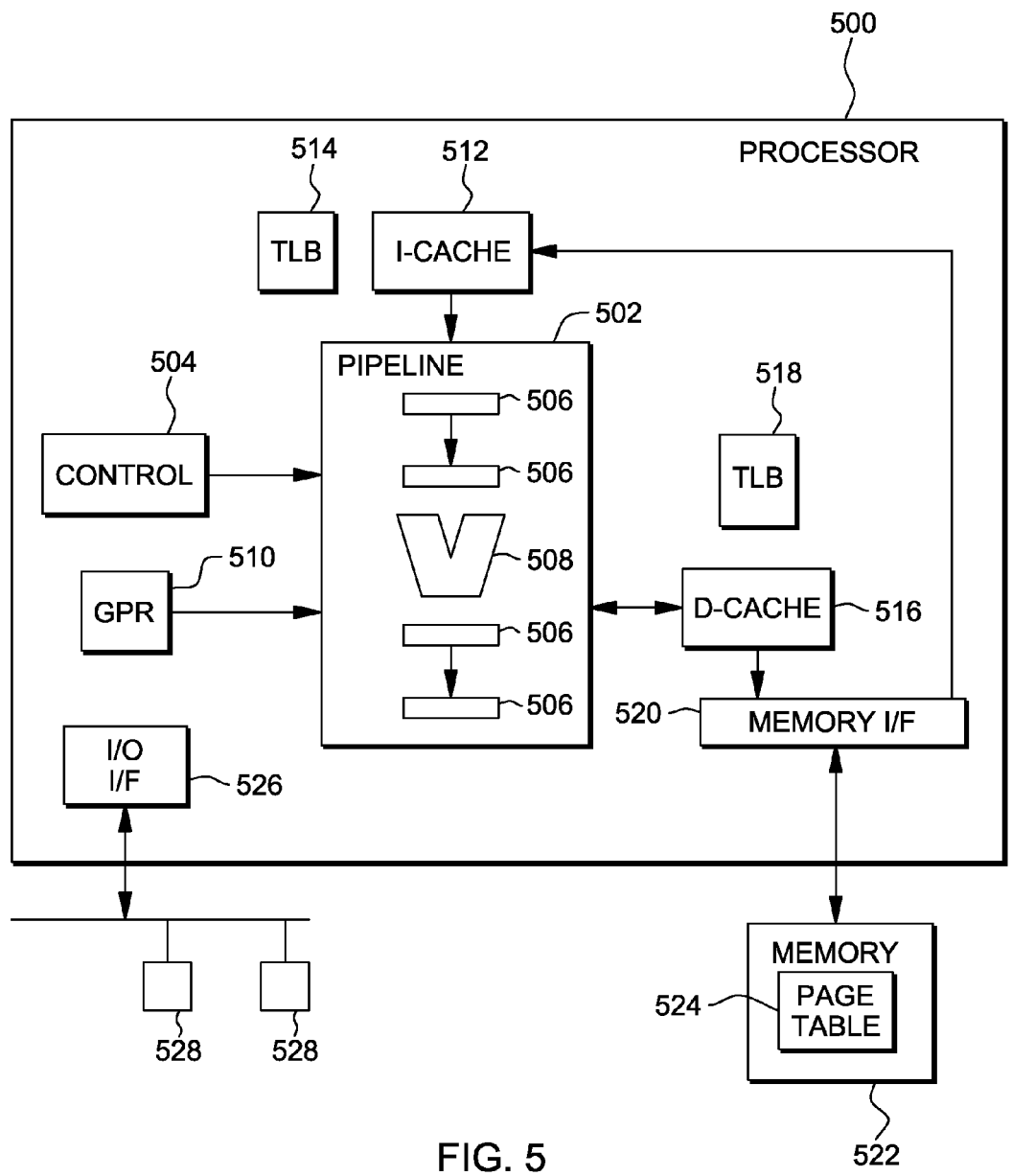
FIG. 5 illustrates functional block diagram of a representative processor, employing a pipelined architecture and a hierarchical memory structure, in accordance with an illustrative embodiment.

FIG. 5 depicts a functional block diagram of a representative processor 500, employing a pipelined architecture and a hierarchical memory structure, in accordance with an illustrative environment. Processor 500 is one example of a processor in which illustrative embodiments of the invention may be executed. The processor 500 executes instructions in an instruction execution pipeline 502 according to control logic 504. The pipeline 502 includes various registers or latches 506, organized in pipe stages, and one or more Arithmetic Logic Units (ALU) 508. A General Purpose Register (GPR) file 510 provides registers comprising the top of the memory hierarchy.

The pipeline 502 fetches instructions from an Instruction Cache (I-Cache) 512, with memory addressing and permissions managed by an Instruction-side Translation Lookaside Buffer (ITLB) 514. Data is accessed from a Data Cache (D-Cache) 516, with memory addressing and permissions managed by a main TLB 518. In various embodiments, the ITLB 514 may comprise a copy of part of the TLB 518. Alternatively, the ITLB 514 and main TLB 518 may be integrated. Similarly, in various embodiments of the processor 500, the I-cache 512 and D-cache 516 may be integrated, or unified. Misses in the I-cache 512 and/or the D-cache 516 cause an access to main (off-chip) memory 522, under the control of a memory interface 520. Page table 524 is stored in memory 522.

One or more of the caches depicted in FIG. 5 divide the entries within the cache or caches into two classes of entries, as described in FIGS. 1, 2, and 3. Control logic 504 manages caches 512, 514, 516, and 518, and in particular manages the one or more caches divided into two classes of entries. When executed by the processor 500, control logic 504 implements the steps required to perform the two-class priority-based replacement policy as depicted in the illustrative embodiments of FIGS. 1, 2, and 3.

The processor 500 may include an Input/Output (I/O) interface 526, controlling access to various peripheral devices 528. Those of skill in the art will recognize that numerous variations of the processor 500 are possible. For example, the processor 500 may include a second-level (L2) cache for any or all of the I, D, and TLB caches 512, 514, 516, 518. In addition, one or more of the functional blocks depicted in the processor 500 may be omitted from a particular embodiment.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for replacing an entry in a cache, the method comprising the steps of:
receiving a first request for information, and in response, searching for the information within the cache, wherein the cache is configured to utilize a priority based first in first out approach for addition of and removal of cache entries, the entries of the cache being included as part of either a first class of entries that are designated low priority or a second class of entries that are designated high priority, the second class of entries having a second class maximum number of entries such that, when the second class has reached the second class maximum number of entries, the addition of a new entry to the second class results in the removal of an old entry already included in the second class, a priority of the old entry being degraded such that the old entry is re-classified as part of the first class of entries, wherein a low priority entry, included the first class is evicted to allow for the addition of the old entry when the first class has reached a first class maximum number of entries;

in response to a cache miss:
locating the requested information outside of the cache;
selecting an entry, from the first class of entries in the cache, to be evicted from the cache;
replacing, into the first class of entries, the entry to be evicted with the requested information;

receiving a second request for the information;
in response to a cache hit:
classifying the entry containing the requested information as belonging to the second class of entries, wherein the second class comprises a plurality of entries that have a higher priority than the entries included in the first class of entries, and are not selectable for eviction during the addition of a low priority entry;
re-classifying, as belonging to the first class of entries, another entry from the second class of entries;
wherein the entry re-classified as belonging to the first class of entries and the entry classified as belonging to the second class of entries respectively have a priority indicated by at least one bit; and
wherein the priority of an entry included in the second class of entries is degraded when an entry included in the first class of entries is selected for eviction.

2. The method of claim 1, wherein the cache is a Translation Lookaside Buffer such that receiving the second request, for the information included in the Translation Lookaside Buffer, includes the identification of an action specified by the second request to be performed for a referenced page corresponding to the information, and wherein the Translation Lookaside Buffer includes at least one of a) a first pointer that indicates which entry is to be replaced, the first pointer being configured to selectively indicate at least one entry with a lower priority than the entries included in the second class of entries, and b) a second pointer that indicates which priority is to be downgraded.

3. The method of claim 1, further comprising the step of relocating an entry marked as belonging to the second class of entries into a separate cache.

4. The method of claim 1, further comprising the step of marking the entries in the first and second classes to indicate that the entries in the first class are available for replacement before the entries in the second class.

5. The method of claim 1, further comprising the step of marking the entries in the first and second classes to indicate that the entries in the first class are available for replacement but the entries in the second class are not available for replacement.

6. The method of claim 4, wherein the marking steps comprise the steps of setting a field in each of the entries in the first and second classes to indicate the respective availabilities for replacement.

7. The method of claim 1, wherein the step of classifying the entry containing the requested information as belonging to the second class of entries comprises the step of:
determining a class for the entry containing the information based on one or more attributes of the referenced page corresponding to the information, the one or more attributes comprising:
a first attribute indicating whether the page is private or shared;
a second attribute indicative of page permissions including read, write, and execute;
a third attribute indicative of a software selection of the page as high priority; and
a fourth attribute indicative of a recent history of page accesses.

8. The method of claim 1, wherein the step of classifying the entry containing the requested information as belonging to the second class of entries is based on the action specified by the second request.

9. The method of claim 1, wherein the step of selecting an entry from the first class of entries to be evicted from the cache is based on a First-In First-Out (FIFO) algorithm for entries in the first class.

10. The method of claim 9, further comprising the step of selecting an invalid entry as the entry to be evicted.

11. The method of claim 1, wherein the step of re-classifying, into the first class of entries, the other entry from the second class of entries comprises the steps of:
determining that the second class of entries is full; and
selecting the entry to be re-classified based on a First-In First-Out (FIFO) algorithm for entries in the second class.

12. The method of claim 1, wherein the step of re-classifying, into the first class of entries, the other entry from the second class of entries comprises the step of determining that the entry within the second class has been passed over in the step of selecting an entry from the first class of entries to be evicted from the cache.

13. A method for replacing an entry in a Translation Lookaside Buffer (TLB), the method comprising the steps of:
in response to a cache miss in the TLB for a requested virtual address:
locating the requested virtual address in a page table;
selecting an entry to be evicted from a first class of entries in the TLB;
replacing, in the first class of entries, the entry to be evicted with an entry from the page table for the requested virtual address; and
in response to a cache hit in the TLB for a subsequent request for the virtual address:
translating the virtual address with translation data found in an entry of the TLB corresponding to the cache hit;
performing an action for a referenced page corresponding to the virtual address;
classifying the entry of the TLB corresponding to the cache hit as belonging to a second class of entries, wherein the second class comprises a plurality of entries that have a higher priority than the entries included in the first class of entries, and are not selectable for eviction during the addition of a low priority entry;
re-classifying, as belonging to the first class of entries, another entry from the second class of entries;
wherein the TLB is configured to utilize a priority based first in first out approach for addition of and removal of TLB entries, the entries of the TLB being included as part of either a first class of entries that are designated low priority or a second class of entries that are designated high priority, the second class of entries having a second class maximum number of entries such that, when the second class has reached the second class maximum number of entries, the addition of a new entry to the second class results in the removal of an old entry already included in the second class, a priority of the old entry being degraded such that the old entry is re-classified as part of the first class of entries, wherein a low priority entry, included the first class is evicted to allow for the addition of the old entry when the first class has reached a first class maximum number of entries;

wherein the entry re-classified as belonging to the first class of entries and the entry classified as belonging to the second class of entries respectively have a priority indicated by at least one bit;

wherein the TLB includes at least two pointers that respectively indicate which entry is to be replaced and which priority is to be downgraded, and at least one of the two pointers is configured to selectively indicate entries with a low priority; and wherein the priority of an entry included in the second class of entries is degraded when an entry included in the first class of entries is selected for eviction.

14. A processor comprising a cache and control logic for managing the cache, wherein the control logic, when executed by the processor, implements a method for replacing an entry in the cache, the method comprising:

receiving a first request for information, and in response, searching for the information within the cache, wherein the cache is configured to utilize a priority based first in first out approach for addition of and removal of cache entries, the entries of the cache being included as part of either a first class of entries that are designated low priority or a second class of entries that are designated high priority, the second class of entries having a second class maximum number of entries such that, when the second class has reached the second class maximum number of entries, the addition of a new entry to the second class results in the removal of an old entry already included in the second class, a priority of the old entry being degraded such that the old entry is re-classified as part of the first class of entries, wherein a low priority entry, included the first class is evicted to allow for the addition of the old entry when the first class has reached a first class maximum number of entries;

in response to a cache miss:
  locating the requested information outside of the cache;
  selecting an entry, from a first class of entries in the cache, to be evicted from the cache;
  replacing, in the first class of entries, the entry to be evicted with the requested information;
receiving a second request for the information;
in response to a cache hit:
  classifying the entry containing the requested information as belonging to a second class of entries, wherein the second class comprises a plurality of entries that have a higher priority than the entries included in the first class of entries, and are not selectable for eviction during the addition of a low priority entry;
  re-classifying, into the first class of entries, another entry from the second class of;
wherein the entry included in the first class of entries and the entry classified as belonging to the second class of entries respectively have a priority indicated by at least one bit; and
wherein the priority of an entry included in the second class of entries is degraded when an entry included in the first class of entries is selected for eviction.

15. The processor of claim 14, wherein the cache is a Translation Lookaside Buffer such that receiving the second request, for the information included in the Translation Lookaside Buffer, includes the identification of an action specified by the second request to be performed for a referenced page corresponding to the information, and wherein the Translation Lookaside Buffer includes at least one of a) a first pointer that indicates which entry is to be replaced, the first pointer being configured to selectively indicate at least one entry with a lower priority than the entries included in the second class of entries, and b) a second pointer that indicates which priority is to be downgraded.

16. The processor of claim 14, wherein the method further comprises the step of relocating an entry marked as belonging to the second class of entries into a separate cache.

17. The processor of claim 14, wherein the method further comprises the step of marking the entries in the first and second classes to indicate that the entries in the first class are available for replacement before the entries in the second class.

18. The processor of claim 14, wherein the method further comprises the step of marking the entries in the first and second classes to indicate that the entries in the first class are available for replacement but the entries in the second class are not available for replacement.

19. The processor of claim 17, wherein the marking steps comprise the step of setting a field in each of the entries in the first and second classes to indicate the respective availabilities for replacement.

20. The processor of claim 14, wherein the step of classifying the entry containing the requested information as belonging to the second class of entries comprises the step of:
  determining a class for the entry containing the requested information based on one or more attributes of the referenced page, the one or more attributes comprising:
    a first attribute indicating whether the page is private or shared;
    a second attribute indicative of page permissions including read, write, and execute;
    a third attribute indicative of a software selection of the page as high priority; and
    a fourth attribute indicative of a recent history of page accesses.

21. The processor of claim 14, wherein the step of classifying the entry containing the requested information as belonging to the second class of entries is based on the action specified.

22. The processor of claim 14, wherein the step of selecting an entry from the first class of entries to be evicted from the cache is based on a First-In First-Out (FIFO) algorithm for entries in the first class.

23. The processor of claim 22, wherein the method further comprises the step of selecting an invalid entry as the entry to be evicted.

24. The processor of claim 14, wherein the step of re-classifying, into the first class of entries, the other entry within the second class of entries comprises the steps of:
  determining that the second class of entries is full; and
  selecting the entry to be re-classified based on a First-In First-Out (FIFO) algorithm for entries in the second class.

25. The processor of claim 14, wherein the step of re-classifying, into the first class of entries, the other entry within the second class of entries comprises the step of determining that the entry within the second class has been passed over in the step of selecting an entry from the first class of entries to be evicted from the cache.

* * * * *